United States Patent
Kanekiyo et al.

(10) Patent No.: US 6,386,269 B1
(45) Date of Patent: *May 14, 2002

(54) METHOD OF MANUFACTURING THIN PLATE MAGNET HAVING MICROCRYSTALLINE STRUCTURE

(75) Inventors: Hirokazu Kanekiyo, Kyoto; Satoshi Hirosawa, Otsu, both of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/355,789

(22) PCT Filed: Jan. 28, 1998

(86) PCT No.: PCT/JP98/00330

§ 371 Date: Aug. 27, 1999

§ 102(e) Date: Aug. 27, 1999

(87) PCT Pub. No.: WO98/35364

PCT Pub. Date: Aug. 13, 1998

(30) Foreign Application Priority Data

Feb. 6, 1997 (JP) .............................................. 9-039880
Mar. 10, 1997 (JP) .............................................. 9-074443

(51) Int. Cl.⁷ ........................ B22D 11/06; B22D 11/113
(52) U.S. Cl. ........................ 164/463; 474/475; 474/477
(58) Field of Search ................................ 164/463, 475, 164/477, 474; 148/122

(56) References Cited

U.S. PATENT DOCUMENTS

| | | | |
|---|---|---|---|
| 4,402,770 A | 9/1983 | Koon | |
| 4,802,931 A | 2/1989 | Croat | |
| 4,935,074 A | 6/1990 | Mooij et al. | |
| 4,935,075 A | 6/1990 | Mizoguchi et al. | |
| 6,168,673 B1 | * 1/2001 | Kanekiyo et al. | ........... 164/463 |

FOREIGN PATENT DOCUMENTS

| | | |
|---|---|---|
| EP | 0542529 | 5/1993 |
| EP | 0657899 | 6/1995 |
| JP | 6115943 | 1/1986 |
| JP | 6318602 | 1/1988 |
| JP | 6-251919 | * 9/1994 |
| WO | 8804098 | 6/1988 |

OTHER PUBLICATIONS

Patent Abstracts of Japan, No. 01171209, dated Jul. 6, 1989 of European Appln. No. 62331396 dated Dec. 25, 1987 to K. Nobuyasu entitled "Manufacture of Permanent Magnet".

(List continued on next page.)

*Primary Examiner*—Kuang Y. Lin
(74) *Attorney, Agent, or Firm*—Dykema Gossett PLLC

(57) ABSTRACT

The present invention is presented with the object of providing a manufacturing method for thin-plate magnets that, as cast, exhibit an intrinsic coercive force iHc of 2.5 kOe or greater and a residual magnetic flux density Br of 9 kG or greater, exhibit a performance-to-cost ratio comparable to hard ferrite magnets, and exhibit a fine crystalline structure with a thickness of 70 to 500 μm wherewith magnetic circuits can be made smaller and thinner. By employing alloy melts to which specific elements have been added, in a process wherein alloy melts of specific composition are continuously cast on a rotating cooling roller or rollers in a reduced-pressure inert or inactive gas atmosphere at 30 kPa or less, and fine crystalline permanent magnets having a fine crystalline structure of 10 to 50 nm are fabricated, fine crystalline permanent magnets having a thickness of 70 to 500 μm can be obtained wherein iHc is improved to 2.5 kOe or greater, and the ideal roller circumferencied speed range wherein hard magnetic properties are manifested can be broadened as compared to the conditions under which Nd—Fe—B ternary magnets are fabricated.

7 Claims, 2 Drawing Sheets

OTHER PUBLICATIONS

Patent Abstracts of Japan, No. 08264363, dated Oct. 11, 1996 of European Appln. No. 07091829, dated Mar. 24, 1995 to T. Masahiro entitled "Manufacture of Rare Earth Permanent Magnet".

H. Kanekiyo et al., "Thick $Fe_3 B/Nd_2Fe_{14}B$ Nanocomposite . . . Slow Quenching" in J. of Appl. Physics, vol. 83, No. II, Jun. 1, 1998, pp. 6265–6267.

Y.S. Cho et al., "Magnet Properties of New Nd–Fe–B Nanocrystalline . . . Phase" in JEEE Transactions on Magnetics, vol. 32, No. 3, May 1996, pp. 1964–1966.

* cited by examiner

METHOD OF MANUFACTURING THIN PLATE MAGNET HAVING MICROCRYSTALLINE STRUCTURE

This application claims the benefit of PCT application PCT/JP98/00330, filed Jan. 28, 1998.

TECHNICAL FIELD

This invention relates to a manufacturing method for thin-plate magnets ideal for magnetic circuits used in various small motors, actuators, and magnetic sensors, etc. In the present invention, magnets are obtained, by the method of continuously casting a melt having a specific composition containing 6 at % or less of a rare earth element and 15 to 30 at % boron, on a turning cooling roller or rollers, in a prescribed reduced-pressure inactive gas atmosphere, so that the magnets have a crystalline structure wherein, in the state wherein they are cast, 90% or more is actually constituted by an $Fe_3B$ compound and α-Fe coexisting with a compound phase having an $Nd_2Fe_{14}B$ crystalline structure, and exhibit a fine crystalline structure having for each configuring phase a mean crystal grain diameter of from 10 to 50 nm. The present invention relates to a method of manufacturing thin-plate magnets, immediately from the alloy melt, having a fine crystalline structure with a thickness of 70 to 500 μm and exhibiting magnetic properties of iHc≧2.5 kOe and Br≧9 kG.

BACKGROUND ART

Even higher performance, smaller size, and lighter weight are now being demanded in home electric appliances, automated office equipment, and electrical fixtures. In this context, design work is being done to maximize the performance-to-weight ratio in the entire magnetic circuits which use permanent magnets. In particular, in the structures of brush-type DC motors that make up the majority of the motors now being produced, permanent magnets having a residual flux density Br of 5 to 7 kG or so are considered ideal, but such cannot be obtained with conventional hard ferrite magnets.

Such magnetic characteristics can be realized in Nd—Fe—B sintered magnets and Nd—Fe—B bonded magnets wherein the main phase is $Nd_2Fe_{14}B$, for example. However, as they contain 10 to 15 at % of Nd which requires a great number of process steps and large-scale equipment for the metal separation refinement and reduction reactions, their cost becomes much higher than the cost of hard ferrite magnets, and, in view of the performance-to-cost ratio, they are only replacing hard ferrite magnets in some models. Currently, moreover, no inexpensive permanent magnet material which exhibit a Br of 5 kG or higher has yet been found.

Furthermore, in order to achieve smaller and thinner magnetic circuits, thin-plate permanent magnets wherein the thickness of the permanent magnet itself is on the order of 100 to 500 μm are being sought. However, because of the great difficulty of obtaining bulk material for Nd—Fe—B sintered magnets having a thickness of less than 500 μm, such can only be fabricated by grinding a plate-form sintered body several mm in thickness or by the method of slicing the bulk material with a wire saw, leading to the problems of high cost and low yield.

Nd—Fe—B bonded magnets are obtained by using a resin to bond together powder having a diameter of 10 to 500 μm, wherefore it is very difficult to form bonded magnets having a thin-plate thickness of 100 to 300 μm.

Recently, in the field of Nd—Fe—B magnets, a magnet material has been proposed wherein an $Fe_3B$ compound is made the main phase with an $Nd_4Fe_{77}B_{19}$ (at %) neighboring composition (R. Coehoorn et al., J. de Phys, C8, 1988, pages 669, 670). The details of this technology are disclosed in U.S. Pat. No. 4,935,074.

Even earlier, in U.S. Pat. No. 4,402,770, Koon proposed a method for manufacturing a permanent magnet made up of fine crystals wherein an La—R—B—Fe amorphous alloy containing La as a mandatory element is subjected to a crystallizing heat treatment.

More recently, Richter et al. have reported producing amorphous flakes by spraying an Nd—Fe—B—V—Si alloy melt containing 3.8 to 3.9 at % of Nd onto a turning copper roller, heat treating these flakes at a temperature of 700° C., and thus obtaining thin pieces having hard magnetic properties, as disclosed in EP Patent Application 558691B1. These permanent magnet materials obtained by subjecting amorphous flakes having a thickness of 20–60 μm to a crystallizing heat treatment have a metastable structure containing a crystalline aggregate structure wherein a soft magnetic $Fe_3B$ phase and a hard magnetic $R_2Fe_{14}B$ phase are mixed.

The permanent magnet materials noted above exhibit a Br of around 10 kG and an iHc of 2 to 3 kOe, wherein expensive Nd is contained in a low concentration of 4 at % or so, wherefore the raw materials mixed in are less expensive than for Nd—Fe—B magnets wherein the main phase is $Nd_2Fe_{14}B$.

In the permanent magnet materials described above, however, the rapid solidification conditions are limited because making the raw materials so mixed in to an amorphous alloy is a mandatory condition, and, at the same time, the heat treatment requirement for obtaining a hard magnetic material are narrowly limited. Hence these are not practical in terms of industrial production, and thus cannot be provided as inexpensive replacement products for hard ferrite magnets. Furthermore, such permanent magnet materials are obtained by subjecting amorphous flakes having a thickness of 20 to 60 μm to a crystallizing heat treatment, wherefore it is not possible to obtain permanent magnets having a thickness of 70–500 μm required for thin-plate magnets.

Meanwhile, U.S. Pat. No. 4,802,931 discloses a rapidly solidified Nd—Fe—B magnet material consisting of a structure formed of a crystalline substance exhibiting hard magnetism that is directly obtained by rapidly solidifying an alloy melt on a roller rotating with a circumferential speed of about 20 m/s. However, the rapidly solidified alloy flakes obtained under these conditions have a thickness of around 30 μm, wherefore, although they can be ground to a powder having a grain diameter of between 10 and 500 μm or so and thus used in the bonded magnets described earlier, they cannot be used in thin-plate magnets.

DISCLOSURE OF INVENTION

An object of the present invention is to resolve the problems noted above in Nd—Fe—B magnets containing 6 at % or less of a rare earth element and exhibiting fine crystallization. Another object thereof is to obtain, by casting, magnets exhibiting a performance-to-cost ratio comparable to hard ferrite magnets and exhibiting an intrinsic coercive force iHc of 2.5 kOe or greater and a residual magnetic flux density Br of 9 kG or greater. Yet another object thereof is to provide a method for manufacturing thin-plate magnets having a fine crystalline structure and thickness of 70 to 500 μm wherewith it is possible to make magnetic circuits smaller and thinner.

The inventors previously disclosed (in Japanese Patent Application No. H8-355015/1996) how to obtain a fine crystalline permanent magnet exhibiting hard magnetic properties (iHc≧2 kOe and Br≧10 kG) directly from alloy melts, by a manufacturing method wherein alloy melts of a low-rare-earth Nd—Fe—B ternary structure containing 6 at % or less of Nd and 15 at % to 30 at % of boron are continuously cast on a cooling roller turning with a roller circumferential speed of 2 to 10 m/s in a specific reduced-pressure inert or inactive gas atmosphere. There is a problem in this method of manufacturing Nd—Fe—B ternary magnets, however, in that the roller circumference speed range must be narrowly limited to obtain the hard magnetism. In addition, in these Nd—Fe—B ternary magnets, the best coercive force obtainable is on the order of 2 to 3 kOe. As a consequence, not only is the thermal demagnetization great, but it is necessary also to raise the operating point of the magnets as high as possible, whereupon problems arise due to limitations in terms of magnet shape and utilization environment.

The inventors thereupon conducted multifaceted research on the problems involved in manufacturing Nd—Fe—B fine crystalline permanent magnets containing low rare earths wherein soft magnetic phases and hard magnetic phases are present together in a nano-mater size scale. As a result of this research, the inventors found that the problems noted above can be resolved by employing an alloy melt, to which a specific element has been added, in the process previously proposed by the inventors for manufacturing fine crystalline permanent magnets exhibiting a fine crystalline structure of 10 to 50 nm, directly from the alloy melt, by continuously casting the alloy melt on a turning cooling roller in a specific reduced-pressure inert or inactive gas atmosphere. With this method in which the alloy melt to which the specific element has been added is used, the iHc of the magnets can be improved to 2.5 kOe or better, the optimum roller circumferential speed range wherewith hard magnetic properties are obtained can be expanded, in comparison to manufacturing conditions conventional Nd—Fe—B ternary magnet, and, at the same time, fine crystalline permanent magnets can be obtained having a thickness of 70 to 500 μm. Thus was the present invention perfected.

More specifically, in the manufacturing method for thin-plate magnets having a fine crystalline structure according to the present invention, an alloy melt is used that is expressed by a composition formula of either $Fe_{100-x-y-z}R_xA_yM_z$ or $(Fe_{1-m}Co_m)_{100-x-y-z}R_xA_yM_z$ (where R is one or more elements in the group Pr, Nd, Tb, and Dy, A is either C, or B, or C and B, and M is one or more elements in the group Al, Si, Ti, V, Cr, Mn, Ni, Cu, Ga, Zr, Nb, Ag, Hf, Ta, W, Pt, Au, and Pb), and that satisfies the conditions $1 \leq x<6$ at %, $15<y\leq30$ at %, $0.01\leq z\leq7$ at %, and $0.001\leq m\leq0.5$ for the symbols x, y, z, and m delimiting the composition range, respectively.

In the present invention, this alloy melt is continuously cast on a cooling roller or rollers that rotate with a roller circumferential speed of 1 to 10 m/s (at an average cooling speed of from $3\times10^3$ to $1\times10^{5°}$ C./sec), in a reduced-pressure inert or inactive gas atmosphere at 30 kPa or less. Thus it is possible to directly obtain, in the condition as cast, permanent magnets that exhibit magnetic properties of iHc≧2.5 kOe and Br≧9 kG, with a thickness of 70 to 500 μm, made up of fine crystallite having a mean crystalline grain diameter of 50 nm or less, 90% or more whereof is comprised by a crystalline structure wherein an $Fe_3B$ compound and α-Fe coexist with a compound phase having an $Nd_2Fe_{14}B$ crystalline structure.

The present invention, moreover, is a manufacturing method wherewith can be obtained thin-plate permanent magnets exhibiting magnetic properties of iHc≧2.5 kOe and Br≧9 kG, wherein the alloy melt noted above is continuously cast on a rotating cooling roller or rollers to yield a cast alloy having a thickness of 70 to 500 μm, made up of fine crystallites having a mean crystalline grain diameter of 10 nm or less, whereafter this is subjected to a heat treatment to grow crystal grains in a temperature region of 550° C. to 750° C., thereby yielding a fine crystalline alloy exhibiting a mean crystalline grain diameter of 10 to 50 nm.

BEST MODE FOR CARRING OUT THE INVENTION

Figure 1:
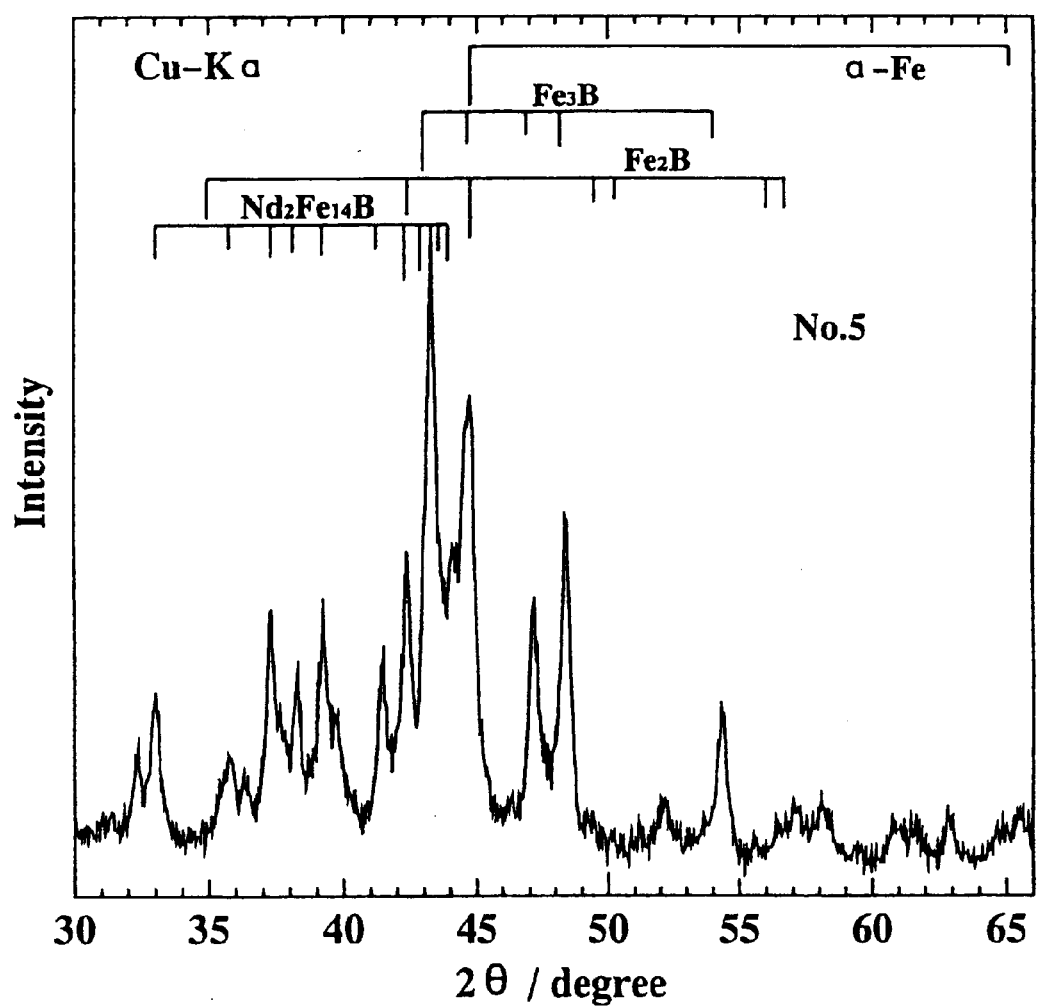
FIG. 1 is a graph representing a Cu—Kα characteristic x-ray diffraction pattern for a specimen in an embodiment.

The alloy compositions involved in the present invention are now described in detail.

Excellent magnetic properties can only be obtained when a rare earth element R, which is one or more of the elements Pr, Nd, and Dy, is contained in a specific quantity. An iHc of 2.5 kOe or greater cannot be obtained with other rare earths such as Ce and La. Moreover, the middle and heavy rare earth elements from Sm on down, with the exception of Tb and Dy, bring about a deterioration in the magnetic properties and also make the magnet expensive, wherefore they are undesirable.

When R is less than 1 at %, an iHc of 2.5 kOe or greater cannot be obtained, and when it reaches 6 at % or greater, a Br of 9 kG or higher cannot be obtained, wherefore the range is set at 1 at % or more but less than 6 at %. The preferred range is from 2 at % to 5.5 at %.

The A in the composition formula is either carbon or boron or both carbon and boron. When total A is below 15 at %, the presence of α-Fe in the metal structure after liquid cooling becomes pronounced, and the fabrication of the compound containing the $Nd_2Fe_{14}B$ crystalline structure necessary to the manifestation of coercive force is impaired, so that only an iHc below 1 kOe can be obtained. When that total exceeds 30 at %, on the other hand, the squareness of the demagnetization curve declines sharply. Therefore the range is set at above 15 at % but no greater than 30 at %. The preferred range is from 16 at % to 20 at %.

The remainder after the elements noted above is comprised of Fe. When this Fe is partially replaced by Co, the metal structure is made finer, both the squareness of the demagnetization curve and the maximum energy product (BH)max are improved, heat resistance is enhanced, and, when the alloy melt is rapidly cooled on the turning rollers in fabricating the fine crystalline permanent magnets, the ideal roller circumferential speed range wherein hard magnetism is manifested is broadened, wherefore it is possible to relax the melt cooling conditions wherewith the magnetic properties noted earlier are obtained. These effects are not obtained when the quantity of Co substituted is less than 0.1% relative to the Fe. When that substitution quantity exceeds 50%, on the other hand, a Br of 9 kG or higher cannot be obtained. Therefore the range for the quantity of Co substituted for the Fe is set at 0.5% to 50%. The preferred range is 0.5% to 10%.

The Al, Si, Ti, V, Cr, Mn, Ni, Cu, Ga, Zr, Nb, Mo, Ag, Hf, Ta, W, Pt, Au, and Pb for the added element M contribute in imparting a finer structure to the fine crystalline permanent magnet, improve the coercive force, improve the squareness of the demagnetization curve, and increase both Br and (BH)max. The added element M also, as does the Co, expands the ideal roller circumferential speed range wherewith the magnetic properties can be obtained when rapidly solidifying the alloy melt on the rotating roller to fabricate the fine crystalline permanent magnets, and enables the rapidly solidification conditions for obtaining the magnetic properties noted earlier to be relaxed. These effects are not realized when the added element M is less than 0.01 at %, while at levels above 7 at %, the magnetic property of $Br \geq 9$ kG cannot be realized. Thus the range is set at 0.01 at % to 7 at %. The preferred range is 0.05 at % to 5 at %.

The reasons for the limitations on the manufacturing conditions in the present invention are now explained. What is most important in the present invention is that, when the alloy melt of the specific composition noted in the foregoing is continuously cast on a rotating cooling roller in a reduced-pressure inert or inactive gas atmosphere at 30 kPa or lower, a 10-nm to 50-nm fine crystalline structure is obtained. More specifically, it is most important that the cooling be done so that thin-plate magnets are obtained having in each configuring phase a mean crystalline grain diameter of 10 nm to 50 nm which is necessary to elicit the magnetic properties of $iHc \geq 2.5$ kOe and $Br \geq 9$ kG, formed of a crystalline micro structure wherein an $Fe_3B$ compound and $\alpha$-Fe actually coexist 90% or more with a compound phase having an $Nd_2Fe_{14}B$ crystalline structure, in the condition in which cast.

A feature of the present invention is the specific pressure of the atmosphere when continuously casting the alloy melt. The reason for the limitation thereon is that, when the casting atmosphere exceeds 30 kPa, gas enters in between the cooling rollers and the alloy melt, whereupon the uniformity of the rapid solidification conditions for the cast alloy is lost. As a consequence, a coarse $\alpha$-Fe containing metal structure is formed, and the magnetic properties of $iHc \geq 2.5$ kOe and $Br \geq 9$ kG cannot be realized. The rapid solidification atmosphere is thus made 30 kPa or lower, and preferably 10 kPa or lower. The atmosphere gas should be an inert or inactive gas atmosphere to prevent oxidation of the alloy melt. An Ar atmosphere is the preferred atmosphere.

In the continuous casting method described in the foregoing, when a mean crystalline grain diameter of 10 to 50 nm necessary for obtaining the magnetic properties of $iHc \geq 2.5$ kOe and $Br \geq 9$ kG is not realized, a heat treatment may be performed to achieve grain growth. The heat-treatment temperature at which the magnetic properties are maximized depends on the composition, but at heat-treatment temperatures below 500° C. crystallization is not induced and, hence, a mean crystalline grain diameter of 10 nm or higher is not obtained. When the heat-treatment temperature exceeds 750° C., on the other hand, grain coarsening is pronounced, iHc, Br, and the squareness of the demagnetization curve deteriorate, and the magnetic properties noted above are not obtained. Hence the heat-treatment temperature is limited to the range of 500–750° C.

It is desirable that the heat treatment be conducted either in an inert or inactive gas atmosphere of Ar gas or $N_2$ gas, or in a vacuum at 1.33 Pa or less, to prevent oxidation. Although the magnetic properties are not dependent on the heat-treatment time, when that time exceeds 6 hours, Br does tend to decline with the passage of time, wherefore a time of less than 6 hours is to be preferred.

For the process of casting the alloy melt, a continuous casting method can be adopted which employs either a single cooling roller or double rollers. When the thickness of the cast alloy exceeds 500 μm, however, several hundred nm coarse $\alpha$-Fe and $Fe_2B$ are formed, wherefore the magnetic properties of $iHc \geq 2.5$ kOe and $Br \geq 9$ kG cannot be realized. When the thickness of the cast alloy is 70 μm or lower, on the other hand, the volume fraction of crystalline microstructure contained in the cast alloy declines, and the amorphous phase increases, making it necessary to crystallize the amorphous [alloy] by heat treatment. The rise in alloy temperature brought about by the heat release associated with this amorphous crystallization induces grain growth in the crystalline structure already separated immediately after rapid solidification, resulting in a metal structure that is rougher than the metal structure wherein the mean crystalline grain diameter is 10 to 50 nm as needed to obtain the magnetic properties of $iHc \geq 2.5$ kOe and $Br \geq 9$ kG, and a Br of 10 kG or higher cannot be obtained. Thus the rapid-cooling casting conditions are limited so as to produce cast alloy having a thickness of 70 to 500 μm.

For the material of the cooling roller or rollers used in the continuous casting process, in terms of thermal conductivity, an aluminum alloy, copper alloy, iron, carbon steel, brass, or tungsten can be used. It is also possible to use cooling rollers having a plating on the surface of a roller made of a material noted above, where the plating is either the same or a different material. Either a copper alloy or carbon steel is preferable for the cooling roller material in the interest of mechanical strength and cost. Materials other than those noted above exhibit poor thermal conductivity, and so cannot adequately cool the alloy melt, whereupon coarse $\alpha$-Fe and $Fe_2B$ on the order of several hundreds of nm are formed, and the magnetic properties of $iHc \geq 2.5$ kOe and $Br \geq 9$ kG cannot be realized, wherefore these materials are undesirable.

Taking as an example the case where a copper roller is adopted for the cooling roller which exhibits, in terms of surface roughness, a centerline roughness of $Ra \leq 0.8$ μm, a maximum height of $Rmax \leq 3.2$ μm, and a 10-point mean roughness of $Rz \leq 3.2$ μm, when the roller circumference speed exceeds 10 m/s (average cooling speed $1 \times 10^{5°}$ C./sec), the thickness of the cast alloy drops below 70 μm, the crystalline structure contained in the cast alloy declines, and the amorphous phase increases. When the roller circumference speed is 1.5 m/s or lower, on the other hand, the cast alloy thickness exceeds 500 μm, wherefore $\alpha$-Fe and $Fe_2B$ are formed having a coarseness of several hundreds of nm, and the magnetic properties of $iHc \geq 2.5$ kOe and $Br \geq 9$ kG are not realized, so this is undesirable. That being so, the circumference speed of the copper rollers is limited to a range of 1.5 m/s to 10 m/s. The preferred range is 1 m/s to 6 m/s.

In the case where for the cooling roller or rollers a steel roller is used which exhibits the same surface roughness as the copper roller described above, the alloy melt wettability of the iron cooling roller is superior to that of the copper roller, wherefore when the roller circumferential speed exceeds 7 m/s, the cast alloy thickness drops below 70 μm, the crystalline microstructure contained in the cast alloy declines, and the amorphous phase increases. When the roller circumference speed is below 1 m/s (average cooling speed $3 \times 10^{3°}$ C./sec), the cast alloy thickness exceeds 500 μm, wherefore $\alpha$-Fe and $Fe_2B$ having a coarseness of several hundreds of nm are separated and the magnetic properties of iHc≧2.5 kOe and Br≧9 kG are not realized. Hence, with an iron roller, the roller circumferential speed is limited to a range of 1 m/s to 7 m/s, and preferably to a range of 1.5 m/s to 5.5 m/s.

Furthermore, when a double roller rapid solidification method is adopted wherewith the alloy melt is cooled with two cooling rollers deployed relative to the steel roller described above, the alloy thickness is determined by the distance between the rollers. When the distance between the two rollers is greater than 0.5 mm, the melt passing between the rollers does not make contact with the one of the cooling rollers and so is not effectively cooled, resulting in a metal microstructure containing coarse α-Fe, so this is undesirable. When the distance between the rollers is below 0.005 mm, on the other hand, the melt overflows from between the rollers, so that casting cannot be continued in an uninterrupted fashion, wherefore this is also undesirable. Accordingly, the distance between the two rollers is limited to a range of 0.005 mm to 0.5 mm, and preferably to 0.05 to 0.2 mm.

When the circumferential speed of the two Fe rollers exceeds 8 m/s, the volume fraction of crystalline microstructure contained in the cast alloy declines, and the amorphous phase increases. At roller circumferential speeds below 1 m/s, coarse α-Fe and Fe$_2$B of several hundreds of nm are formed, wherefore the magnetic properties of iHc≧2.5 kOe and Br≧9 kG are not obtained, so this is undesirable also. Accordingly, the roller circumference speed is limited to a range of 1 to 8 m/s. The preferred range is 1.5 to 5 m/s.

For the method of processing the continuous (long) thin-plate magnets obtained by continuous casting into the desired shapes, methods such as etching or ultrasonic processing, etc., commonly used in processing thin-plate metal materials manufactured by rolling may be used. An ultrasound-based stamping process is particularly desirable because the desired shapes can be made therewith without causing cracks to develop in the thin-plate magnets.

The crystalline phase of the fine crystalline permanent magnets according to the present invention is characterized by the fact that an Fe$_3$B compound exhibiting soft magnetism and α-Fe coexist with a hard-magnetic compound phase having an Nd2Fe$_{14}$B crystalline structure in the same structure, and by the fact that it is made up of fine crystalline aggregates wherein the mean crystalline grain diameter in each configuring phase is within the range of 15 to 50 nm. When the mean crystalline grain diameter configuring the fine crystalline permanent magnet exceeds 50 nm, Br and the squareness of the demagnetization curve deteriorate, and the magnetic property of Br≧9 kG cannot be obtained. The finer the mean crystalline grain size the better, but at sizes below 15 nm, a decline in iHc is induced, wherefore the lower limit is made 15 nm.

The thin-plate magnets obtained with the present invention exhibit a thickness of 70 to 500 μm, and, in terms of surface smoothness, exhibit centerline roughness Ra≦5 μm, maximum height ≦20 μm, and 10-point average roughness Rz≦10 μm.

Embodiment 1

Pieces of the metals Fe, Co, C, Al, Si, Ti, V, Cr, Mn, Ni, Cu, Ga, Zr, Nb, Mo, Ag, Hf, Ta, W, Pt, Au, Pb, B, Nd, Pr, Dy, and Tb, at a purity of 99.5% or greater, were measured to obtain a total weight of 30 g. The raw material was placed in a quartz crucible having in the bottom thereof a slit measuring 0.3 mm×8 mm, and melted by induction heating in an Ar atmosphere maintained at the rapid solidification atmosphere pressure noted in Table 1. After bringing the melting temperature to 1300° C., the molten surface was pressurized with Ar gas and, at room temperature, the melt was continuously cast from a height of 0.7 mm at the outer circumferential surface of a Cu cooling roller turning at the roller circumferential speed indicated in Table 1–2. Thus was fabricated continuous thin-plate rapidly solidified alloy at a width of 8 mm.

As indicated by the Cu—Kα characteristic x-ray induced x-ray diffraction pattern for Embodiment Example No. 5 given in FIG. 1, it is verified that the thin-plate magnets obtained have a metal structure wherein an Fe$_3$B compound and α-Fe coexist with a compound phase having an Nd$_2$Fe$_{14}$B crystalline structure. In all of the test samples except No. 1, No. 3, and No. 17, moreover, a fine crystalline structure is exhibited having a mean crystalline grain diameter of 15 nm to 50 nm.

The magnetic properties of the thin-plate magnets obtained were measured with a VSM after taking the thin-plate magnets of prescribed shape stamped out in round disk shapes 5 mm in diameter using an ultrasonic stamping machine and magnetizing them in a 60-kOe pulsed magnetic field. The magnetic properties and mean crystalline grain diameters are listed in Table 2. In the thin-plate magnets in test samples No. 1–19, the elements Co, Al, Si, Ti, V, Cr, Mn, Ni, Cu, Ga, Zr, Nb, Hf, Ta, W, Mo, Ag, Pt, Au, and Pb partially replace the Fe in the configuring phases.

Figure 2:
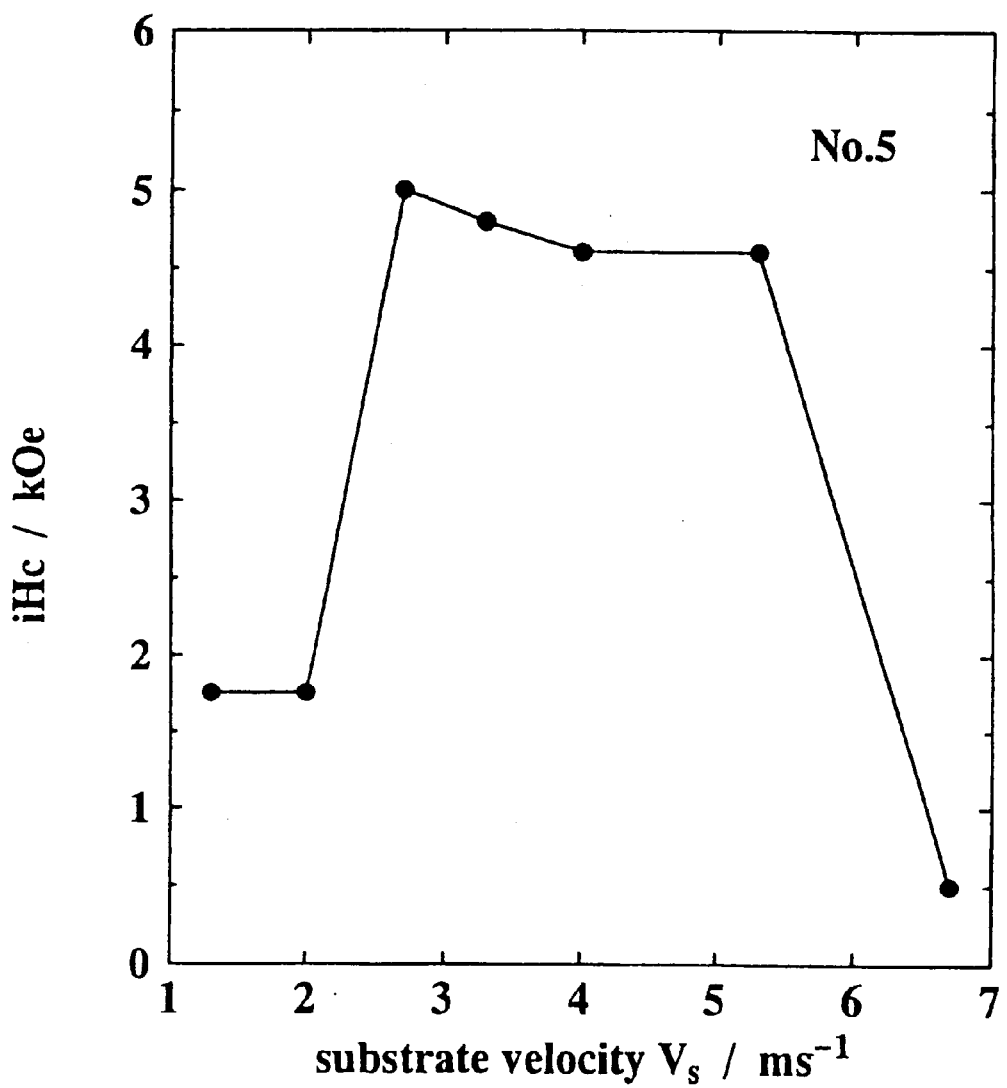
FIG. 2 is a graph representing the dependence of coercive force on the roller circumferential speed during rapid solidification using a turning roller, in an embodiment and in a comparison.

As indicated in FIG. 2 for the dependence of the coercive force on the roller circumference speed in Embodiment No. 5, it is seen that the magnetic properties of the rapidly solidified alloys obtained with the present invention are dependent on the roller circumference speed when the melt is being rapidly solidified. In Table 3 are given the roller circumferential speed ranges wherewith an iHc of 2.5 kOe or greater is obtained by the rapid solidification of the melts having the alloy compositions in Embodiment Example No. 2, No. 4, No. 5, No. 8, No. 9, and No. 10.

Embodiment 2

In No. 1, No. 3, and No. 17 in Table 1-1, the mean crystalline grain diameter was less than 10 nm, wherefore the rapid solidified alloys were heat-treated by maintaining them at 670° C. for 10 minutes in Ar gas to make the mean crystalline grain diameter 10 nm or greater. The magnetic properties were determined as in the first embodiment by measurements made using a VSM on the thin-plate magnets fabricated into prescribed shapes. The measurement results are given in Table 2.

Comparison 1

Continuously cast alloy was fabricated having a width of 8 mm using the same process as in the embodiment 1 and using 99.5% pure Fe, B, R, and Co so as to achieve the compositions No. 20–23 in Table 1-1. When the constituting phases of the test samples obtained were examined by Cu—Kαcharacteristic x-ray diffraction, test sample No. 20 exhibited a metal structure comprising hard-magnetic Nd$_2$Fe$_{14}$B and soft-magnetic Fe$_3$B and α-Fe. In test sample No. 21, Nd$_2$Fe$_{14}$B could be slightly verified, but almost no Fe$_3$B could be verified.

Test sample No. 22 exhibited a metal structure having α-Fe as the main phase, while test sample No. 23 exhibited a structure comprising the non-magnetic phase Nd$_2$Fe$_{23}$B$_3$ and α-Fe, with the metal structure in both of these cases containing no hard-magnetic Nd$_2$Fe$_{14}$B. The magnetic properties measured by VSM in test samples No. 20–23 are listed in Table 2.

Regarding the magnetic properties of the test sample in Comparison No. 20, as indicated by the dependence of the coercive force on the roller circumference speed in FIG. 2, those properties are dependent on the roller circumferential speed during rapid solidification. The roller circumferential speed ranges wherein coercive force is manifest in these Nd—Fe—B ternary test samples are narrow as compared to Embodiment Examples No. 5 and No. 9 containing Co and Cr, Nb, Cu, and Ga. In Table 3 is indicated the roller circumferential speed range wherein an iHc of 2.5 kOe or greater is obtained when rapid solidification the melt having the alloy composition of Comparison No. 20.

TABLE 1-1

|  |  | Composition (at %) | | | |
|---|---|---|---|---|---|
|  |  | $Fe_{1-m}Co_m$ | A | R | M |
| Embodiment | 1 | Fe 73 + Co 3 | B 18.5 | Nd 4.5 | Al 1 |
|  | 2 | Fe 77 + Co 3 | B 18.5 | Nd 3 + Pr 0.5 | Si 1 |
|  | 3 | Fe 75.5 | B 18.5 | Nd 5 | Ti 1 |
|  | 4 | Fe 74.0 | B 18.5 | Nd 5.5 | V 2 |
|  | 5 | Fe 74.0 | B 18.5 | Nd 4.5 | Cr 3 |
|  | 6 | Fe 76.0 | B 18.5 | Nd 3.5 + Dy 1 | Mn 1 |
|  | 7 | Fe 76.0 | B 15 + C 3 | Nd 4.5 | Ni 1.5 |
|  | 8 | Fe 70 + Co 5 | B 15 + C 5 | Nd 2.5 + Pr 1 | Cu 1.5 |
|  | 9 | Fe 70 + Co 2 | B 18.5 | Nd 2 + Dy 2 | Nb 0.5 |
|  | 10 | Fe 73 + Co 3 | B 18.5 | Nd 3.5 + Pr 1 | Ga 1 |
|  | 11 | Fe 76.5 | B 18.5 | Nd 4 | Ag 1 |
|  | 12 | Fe 76.5 | B 18.5 | Nd 4 | Hf 1 |
|  | 13 | Fe 75 + Co 3 | B 18 | Nd 3.5 | Pt 0.5 |
|  | 14 | Fe 75 + Co 2 | B 18.5 | Nd 4 | Ta 0.5 |
|  | 15 | Fe 75 + Co 3 | B 18 | Nd 4.5 | Au 0.5 |
|  | 16 | Fe 70 + Co 2 | B 18.5 | Nd 2 + Dy 2 | W 0.5 |
|  | 17 | Fe 73 + Co 3 | B 18.5 | Nd 4 + Tb 0.5 | Pb 1 |
|  | 18 | Fe 77 | B 7 + C 10 | Nd 5 | Mo 1 |
|  | 19 | Fe 75.5 | B 18.5 | Nd 4 + Tb 1 | Ti 1 |
| Comparison | 20 | Fe 77.5 | B 18.5 | Nd 4 | — |
|  | 21 | Fe 66.0 | B 18.5 | Nd 5.5 | Cr 10 |
|  | 22 | Fe 74.5 | B 18.5 | Nd 4 | Si 3 |
|  | 23 | Fe 74.0 | B 18.5 | Nd 6.5 | Al 1 |

TABLE 1-2

|  |  | Roller Circumferential Speed m/sec | Rapid Solidification Atmosphere Pressure kPa | Casting Alloy Thickness $\mu m$ |
|---|---|---|---|---|
| Embodiment | 1 | 6.0 | 1.3 | 100 |
|  | 2 | 4.0 | 1.3 | 200 |
|  | 3 | 7.0 | 10 | 70 |
|  | 4 | 3.5 | 10 | 240 |
|  | 5 | 3.5 | 10 | 250 |
|  | 6 | 3.0 | 10 | 280 |
|  | 7 | 4.0 | 20 | 210 |
|  | 8 | 2.5 | 20 | 300 |
|  | 9 | 2.5 | 20 | 290 |
|  | 10 | 4.0 | 20 | 180 |
|  | 11 | 3.5 | 20 | 240 |
|  | 12 | 3.0 | 20 | 290 |
|  | 13 | 4.0 | 25 | 210 |
|  | 14 | 3.0 | 20 | 280 |
|  | 15 | 4.0 | 25 | 220 |
|  | 16 | 2.5 | 25 | 290 |
|  | 17 | 6.5 | 30 | 80 |
|  | 18 | 3.5 | 1.3 | 260 |
|  | 19 | 3.5 | 1.3 | 250 |
| Comparison | 20 | 5.0 | 1.3 | 200 |
|  | 21 | 3.0 | 1.3 | 280 |
|  | 22 | 2.5 | 75.0 | 400 |
|  | 23 | 3.5 | 1.3 | 280 |

TABLE 2

|  |  | Magnetic Properties | | | Mean Crystalline Grain |
|---|---|---|---|---|---|
|  |  | Br (kG) | iHc (kOe) | (BH)max (MGOe) | Diameter (nm) |
| Embodiment | 1 | 12.0 | 4.6 | 15.3 | 20 |
|  | 2 | 12.8 | 3.5 | 17.4 | 20 |
|  | 3 | 11.7 | 4.3 | 16.5 | 20 |
|  | 4 | 11.0 | 5.0 | 13.4 | 20 |
|  | 5 | 10.5 | 5.5 | 13.9 | 20 |
|  | 6 | 10.3 | 5.2 | 13.4 | 20 |
|  | 7 | 11.8 | 4.3 | 13.9 | 20 |
|  | 8 | 13.0 | 3.3 | 17.5 | 20 |
|  | 9 | 9.8 | 5.6 | 11.4 | 20 |
|  | 10 | 11.9 | 4.5 | 17.0 | 20 |
|  | 11 | 12.4 | 3.5 | 17.2 | 20 |
|  | 12 | 12.9 | 3.2 | 17.6 | 20 |
|  | 13 | 12.3 | 3.3 | 15.4 | 15 |
|  | 14 | 12.1 | 4.1 | 17.2 | 20 |
|  | 15 | 11.7 | 4.2 | 16.5 | 25 |
|  | 16 | 11.5 | 5.2 | 16.5 | 20 |
|  | 17 | 10.0 | 5.4 | 11.0 | 15 |
|  | 18 | 11.6 | 4.4 | 16.5 | 20 |
|  | 19 | 10.3 | 5.3 | 12.4 | 20 |
| Comparison | 20 | 12.3 | 3.3 | 14.9 | 50 |
|  | 21 | 4.7 | 12.4 | 6.7 | 40 |
|  | 22 | 6.0 | 0.5 | 0.7 | 1 $\mu m$ |
|  | 23 | 4.8 | 0.8 | 0.9 | 100 |

TABLE 3

|  |  | Roller Circumferencied Speed (m/s) |
|---|---|---|
| Embodiment | 2 | 2.0~4.5 |
|  | 4 | 2.0~5.0 |
|  | 5 | 2.0~6.0 |
|  | 8 | 2.0~4.0 |
|  | 9 | 2.0~4.5 |
|  | 10 | 3.0~5.0 |
| Comparison | 20 | 4.2~5.4 |

Industrial Applicability

The present invention is an improved manufacturing method for low-rare-earth-concentration Nd—Fe—B fine crystalline permanent magnets containing both soft magnetic phases and hard magnetic phases. When fine crystalline permanent magnets having a 15-nm to 50-nm fine crystalline structure are fabricated immediately from alloy melts by continuous casting on a rotating cooling roller in a specific reduced-pressure inert or inactive gas atmosphere, by adding Co, Al, Si, Ti, V, Cr, Mn, Ni, Cu, Ga, Zr, Nb, Mo, Ag, Hf, Ta, W, Pt, Au, or Pb into the alloy melt, the coercive force of the magnet can be improved, and the magnetic properties of iHc≧2.5 kOe and Br≧9 kG can be realized. In comparison with conventional Nd—Fe—B alloys, this is also effective in expanding the range of ideal roller circumferential speeds at which hard magnetic properties can be obtained, making it possible to relax the conditions under which fine crystalline permanent magnets having a thickness of 70 to 500 $\mu m$ are made, and to effect stable, low-cost industrial production thereof. The present invention inexpensively provides thin-plate magnets of a thickness of 70 to 500 $\mu m$ that exhibit performance-to-cost ratios comparable to hard-ferrite magnets, which could not previously be produced in large quantities at low cost, and thereby contributes to making magnetic circuits smaller and thinner.

What is claimed is:

1. A method of manufacturing thin plate magnets having a fine crystalline structure comprising the steps of (a) providing an alloy melt having a compositional formula of $Fe_{100-x-y-z}R_xA_yM_z$ or $(Fe_{1-m}Co_m)_{100-x-y-z}R_xA_yM_z$, where R is at least one element selected from the group consisting of Pr, Nd, Tb and Dy, A is at least element selected from the group consisting of C and B, and M is at least one element selected from the group consisting of Al, Si, Ti, V, Cr, Mn, Ni, Cu, Ga, Zr, Nb, Ag, Hf, Ta, W, Pt, Au and Pb, and wherein $1 \leq x \leq 6$ at %, $15 \leq y \leq 30$ at %, $0.01 \leq z \leq 7$ at %, and $0.001 \leq m \leq 0.5$, (b) providing a rotatable cooling roller in a reduced pressure inert gas atmosphere at no more than 30 kPa, (c) rotating said cooling roller at a circumferential speed of 1 to 10 m/s, (d) flowing said alloy melt onto said rotating roller of (c) so as to directly cast thin plate permanent magnets having a thickness of 70 to 500 μm and containing fine crystals having a mean crystalline grain diameter of no more than 50 nm, at least 90% of said fine crystals being comprised of a crystalline structure wherein an $Fe_3B$ compound and α-Fe coexist with a compound phase having an $Nd_2Fe_{14}B$ crystalline structure, and exhibiting magnet properties of iHc$\geq$2.5 kOe and Br$\geq$9 kG.

2. A method according to claim 1, wherein said fine crystals of said cast thin plate permanent magnets have a mean crystalline grain of no more than 10 nm, and including after step (d) a step (e) of heating said magnets to a temperature of 550° C. to 750° C. to yield a fine crystalline alloy therein having a mean crystalline grain diameter of 10 to 50 nm.

3. The method according to claim 1 or 2, including a step of stamping said thin plate permanent magnets to form magnets of prescribed shapes.

4. The method according to claim 1 or 2, wherein in step (b) two cooling rollers are provided that are spaced by a distance of 0.005 to 0.5 mm, wherein in step (c) said two cooling rollers are rotated at a circumferential speed of 1 to 8 m/s, and wherein in step (d) melt alloy is distributed on said two rotating cooling rollers.

5. The method of claim 2, wherein said roller is made of Cu and said circumferential speed is 1.5 to 5 m/s.

6. The method of claim 2, wherein said roller is made of Fe and said circumferential speed is 1 to 7 m/s.

7. The method of claim 2, wherein said melt is cooled at a rate of $3 \times 10^3$ to $1 \times 10^5$ °C./sec.

* * * * *